Nov. 19, 1935. E. B. ERICKSON 2,021,130
STOCK STORING APPARATUS
Filed July 16, 1932 2 Sheets-Sheet 1

INVENTOR.
EDWARD B. ERICKSON
BY Walter L. Piper
ATTORNEYS.

Nov. 19, 1935.  E. B. ERICKSON  2,021,130
STOCK STORING APPARATUS
Filed July 16, 1932  2 Sheets—Sheet 2
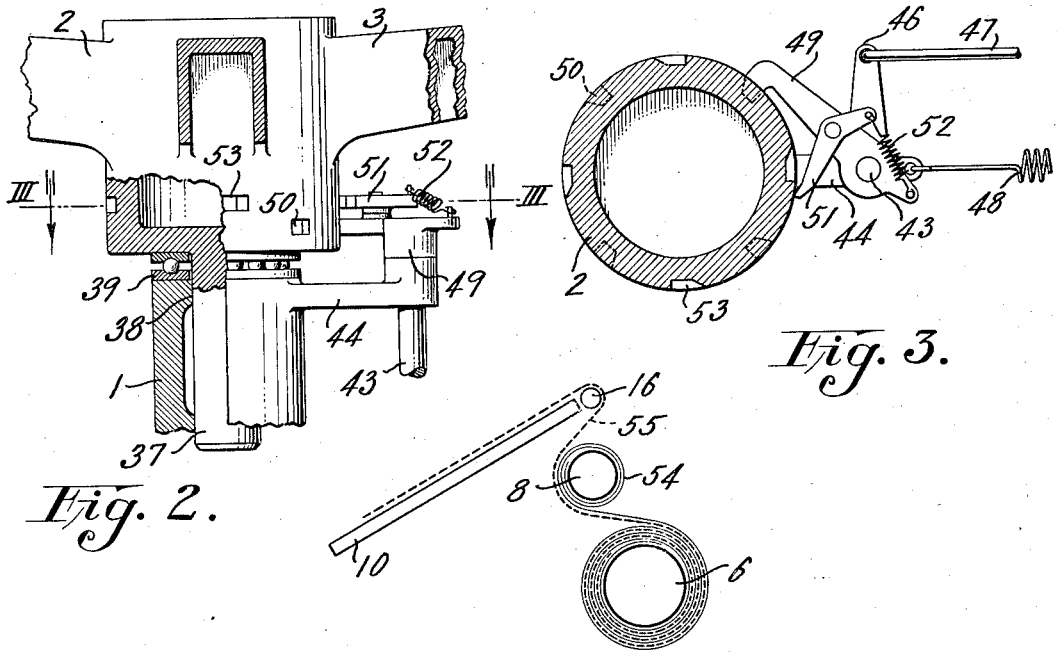
Fig. 2.
Fig. 3.
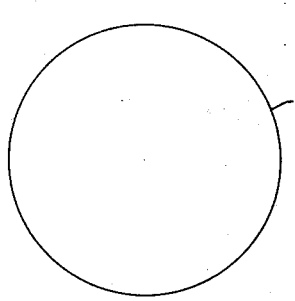
Fig. 4.
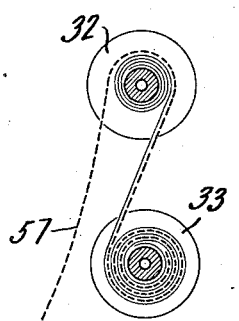
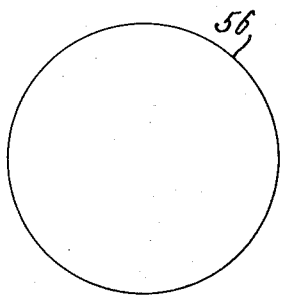
Fig. 5.
INVENTOR.
EDWARD B. ERICKSON
BY Walter L. Pipes
ATTORNEYS.

Patented Nov. 19, 1935

2,021,130

UNITED STATES PATENT OFFICE 2,021,130

STOCK STORING APPARATUS

Edward B. Erickson, Los Angeles, Calif., assignor, by mesne assignments, to United States Rubber Company, New York, N. Y., a corporation of New Jersey Application July 16, 1932, Serial No. 622,936

4 Claims. (Cl. 154—10)

The present invention relates to stock storing apparatus and in particular to means for handling carcass fabric in the rear of tire building machines. Generally, the apparatus consists of a turret arrangement positioned in back of a tire building machine so that the turret supply rolls are in alignment and parallel with the tire building drum; said supply rolls being in sets opposite each other in order to allow an operator to splice and wind lengths of fabric on one set of rolls while the tire builder withdraws fabric from the opposite set of rolls; said stock turret providing rotatable means operable by the tire builder, a feature which permits a supply of carcass fabric continuously at the disposal of the tire builder.

Previous to the herein disclosed invention it was customary to use stock turrets in combination with tire building machines, but these previous turrets were adapted to receive replaceable rolls carrying wound fabric. Such an adaptation required the use of large rolls of fabric so that replacements would not be too readily required. As a result these rolls were heavy and bulky, requiring considerable trucking and requiring valuable space for storage. A further disadvantage of this type was, while the roll was full a greater amount of effort was required to pull the fabric from the roll. This condition decreased the speed of the operator and caused the fabric stock to become stretched in the operation of removing it from the roll.

Another type of device for handling carcass fabric in back of tire building machines is the festoon rack. This type consists of a rack adapted to retain a supply of fabric by looping the fabric over a series of fixed rollers and under a series of corresponding floating rollers. In this way the stock may be fed in at one end, and removed at the other end by the tire builder. While a device of this kind operates efficiently, it is objectionable in that it tends to stretch the tire fabric and to decrease its width.

The present invention incorporates the good features of the festoon rack and in addition it overcomes the objectionable feature of stretching the tire fabric. In the festoon rack the operator is required to manipulate a catch for holding the end of the fabric, and a failure to do this at the right time results in the fabric becoming partly unthreaded through the series of rolls. With the new type of stock turret this unfavorable condition cannot occur.

The invention is illustrated in the accompanying drawings, in which:

Fig. 2 shows an enlarged elevation, partly broken away and in section, of the turret rotating means;

Fig. 3 is a plan view of the turret rotating means, taken along lines III—III of Fig. 2;

Fig. 4 illustrates a diagrammatic side view of the fabric supply rolls shown in relation to the building drum; and, Fig. 5 is a diagrammatic side view of other fabric rolls which may be incorporated on the stock turret.

Figure 1:
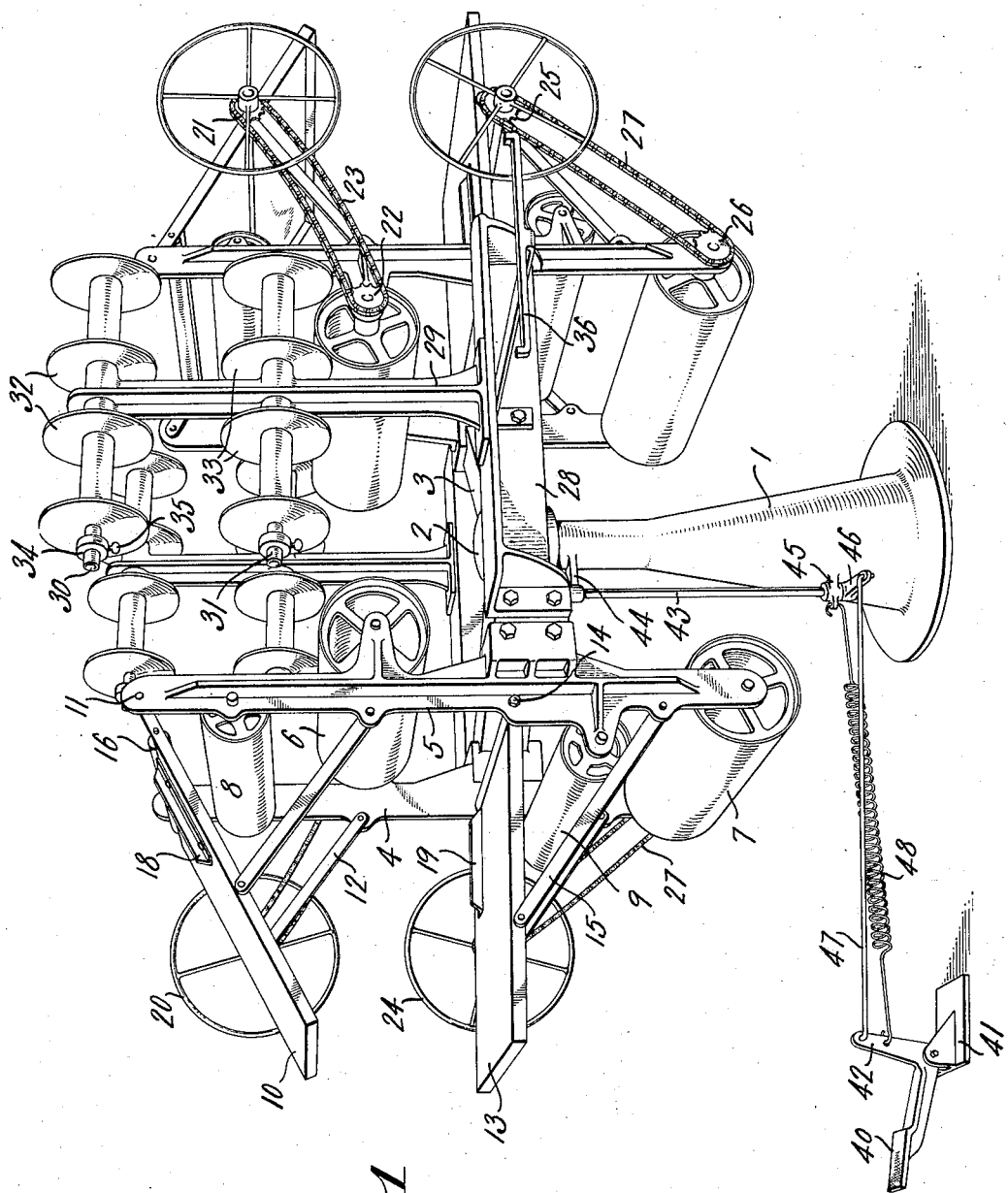
Fig. 1 is a perspective view of the complete stock turret.

The stock turret as shown by Fig. 1 comprises a base pedestal 1 which rotatably supports a hub 2 containing outwardly extending arms 3. At the end of these arms vertical members 4 and 5 are disposed. This constitutes the main frame-work for stock rolls 6 and 7 and liner rolls 8 and 9. A splicing table 10 fastened to the vertical members at 11 and supported by braces 12 co-operates with rollers 6 and 8. In like manner, the splicing table 13 joining the vertical members at 14 and supported by the braces 15 co-operates with rollers 7 and 9. At the inner end of the splicing tables 10 and 13, third rollers 16 and 17, respectively, are mounted. Guide angles 18 and 19 are attached to the splicing tables 10 and 13, respectively, for the purpose of guiding the fabric centrally on the supply rolls. The operator who does the splicing is required to rotate the stock rolls in order to wind the fabric thereon. To facilitate this operation, a light hand wheel 20 is mounted at one side of the splicing table 10 and actuates the supply roll 6 by the sprockets 21 and 22 and the chain 23. The lower supply roll 7 is also operable from a similarly mounted hand wheel 24 connected to the supply roll by sprockets 25 and 26 and chain 27.

The present embodiment incorporates two of the above described stock supply units positioned on the rotatable turret oppositely to each other so that a rotation of 180 degrees of the turret operates to exchange the places of the two units.

In addition to the stock supply rolls, the turret also contains spools for supplying other tire elements. In the present case these spools are wound with strip material known as chafing strips. A base bracket 28 is fastened to the ends of the arms 3 and supports a vertical bracket 29 from which shafts 30 and 31 extend. Spools 32 and 33 are rotatably mounted on the shafts 30 and 31 respectively, and are held in place by the collars 34 containing set screws 35. A T shaped bracket 36 extends outward from the base bracket 28. The purpose of this bracket is to allow the ends of the chafing strips to rest thereon so as to be readily accessible for the tire builder. Like the fabric supply roll units, there are two chafing strip units disposed opposite each other so that a 90 degree movement of the turret results in alternately placing before the tire building machine first a fabric supply unit and then a chafing strip unit.

The rotatable connection between the turret frame and the base pedestal is shown in Fig. 2. A shaft 37 projects downward from the hub 2 and extends into the aperture 38 of the pedestal 1. A thrust bearing 39 surrounding the shaft 37 is placed between the hub 2 and the top of the pedestal 1. This permits easy movement of the turret framework in relation to the base.

Rotation of the turret for a 90 degree movement is accomplished by actuation of a foot pedal placed in a convenient location for the tire builder. This means is illustrated by Figs. 1, 2 and 3. The foot pedal 40, pivoted to the bracket 41 attached to the floor, has an arm 42 projecting upwardly. A vertical shaft 43 is retained by bearing brackets 44 and 45 extending from the base pedestal 1. At the lower end of this shaft a lever 46 is keyed. A connecting rod 47 connects this lever with the foot pedal arm 42. To withdraw the foot pedal to its normal position a spring 48 provides flexible tension in connecting the arm 42 with a lug projecting from the bracket 45. Through this connecting arrangement rotary movement is imparted to the vertical shaft 43 by actuation of the foot pedal 40.

At the top of the vertical shaft 43 a locking lever 49 is keyed. This lever engages with indentations 50 in the hub 2 and holds the turret locked at 90 degree intervals. A propelling lever 51 pivoted to the locking lever is held in engagement with the hub 2 by means of a spring 52 and operates to engage with the depressions 53. In operation, the actuation of the foot pedal moves the locking lever out of engagement with the indentation 50, and at the same time the lever 51 snaps into the depression 53. The foot pedal is released and the spring 48 acting through the connecting rod 47 tends to push the locking lever towards the hub. This action causes the propelling lever 51 to push tangentially against the hub with the result that the turret is set into motion and continues to rotate by its own momentum until the locking lever snaps into one of the indentations 50 in the hub 2.

Referring now to Fig. 4, one end of a strip of cloth or liner 54 is attached to the roller 8 and wound onto this roller in a number of convolutions. The other end of the liner is attached to the roller 6. Rollers 9 and 7 support a liner in the same manner. At the beginning of the operation an operator obtains a cut strip of fabric, usually direct from a bias cutter, and threads this strip 55 so as to wind it up on roller 6 between convolutions of the liner. This separation of the fabric is necessary due to its rubberized surface which would otherwise adhere too strongly to adjacent similar material. To wind the fabric around roller 6 the operator spins the hand wheel 20. At the end of the strip the operator splices a second strip and also winds this into the convolutions of liner around the roller 6. Roller 7 is supplied with material in the same way, the difference between the two sets of rollers being that one strip of the fabric stock is reversed so that the alternate plies of the tire will have their cords running in opposite directions.

Assuming now that the device is supplied with tire stocks, the tire builder takes the loose end of the fabric lying on the splicing table 10 and wraps it around the building drum 56. Upon encircling the drum the fabric is separated by tearing, and the ply on splicing table 13 is applied to the drum. As soon as the second ply is severed from the remaining fabric on the roll, the operator depresses the foot pedal and the turret turns around 90 degrees with the chafing strip spools in alignment with the building drum as shown by Fig. 5. At this station the chafing strips 57 are applied to the drum. The pedal is again depressed and the ply stock is brought in accessible relation with the building drum. At this station the balance of the plies are applied to the carcass and the turret remains stationary until the first tire is completed and the first two plies are drawn from the stock rolls for the building of the second tire. From this point on, the cycle of operation is repeated.

During the time the tire builder is withdrawing stock from one unit of stock rolls, an operator replenishes the supply at the opposite unit. The liner on the ply stock rolls forms a permanent part of the device; that is, as long as it remains serviceable. It is wound up on the liner rolls 8 and 9 automatically as the ply stock is pulled from the unit; and when the stock is fed into the unit, the liner again is used to separate the stock.

In this manner of rolling the ply stock into rolls from which it is directly afterwards withdrawn, it should be understood that this method is not intended to operate as the ordinary supply type of stock rolls. The present device operates with the direct fabrication system; that is, where the strip stock is taken directly from the bias cutter and placed in convenient position for the tire builder. It is intended that the ply stock rollers should contain only a few convolutions of fabric. For example, the rollers need not contain any more fabric than is required to make three plies on the building drum, or, it should contain sufficient amount of fabric so that when the ply building operation is complete at one station there will be sufficient fabric left onto which additional strips may be spliced and wound onto the stock roll. The advantage of the small amount of fabric on the roll is that there is an almost direct flow of fabric from the bias cutter to the building drum. This prevents an accumulation of stored fabric with its accompanying tied-up investment. A further and important advantage is that the lightness of the roll, with the small amount of fabric, results in that the fabric may be quickly and easily withdrawn, a condition which allows the operator to give more attention to the application of the ply and less attention to the source of the material. A still further advantage is that the ply stock is not stretched. Such a stretching of the stock is prevalent in practically all other types of fabric supplying devices.

While I have shown and described a present preferred embodiment of apparatus for practicing the invention it is to be understood that it may be otherwise embodied within the spirit of the invention and the scope of the appended claims.

Having thus described my invention, what I claim and desire to protect by Letters Patent is:

1. Stock storing apparatus comprising a splicing table, a pair of spaced drums co-operating with said table and forming a permanent part of said apparatus, and a liner attached to said drums and movable therebetween during the storing and discharge of stock, and means for actuating at least one of the drums for coiling the liner and stock thereabout.

2. Stock storing apparatus comprising a turret, a plurality of storing units associated with one portion of the turret to present a plurality of sources of stock to an operator, each unit comprising a table, a pair of spaced drums co-operating with said table and forming a permanent part of said apparatus, a liner permanently attached to said drums and movable therebetween during the storing of stock on and discharge of stock from one of said drums, and means for actuating at least one of the drums for coiling the liner and stock thereabout.

3. Stock storing apparatus comprising a turret rotatable about a vertical axis, a plurality of superposed storing units, each of said units being arranged on a different radius about said axis of the turret to present a plurality of sources of stock to an operator, each unit comprising a table, a pair of spaced drums co-operating with said table forming a permanent part of said apparatus, a liner attached to said drums and movable therebetween during the storing of stock on and discharge of stock from one of said drums, and means for actuating at least one of the drums for coiling the liner and stock thereabout.

4. Stock storing apparatus comprising a turret, a plurality of storing units associated with substantially diametrically opposite portions of the turret to present a plurality of sources of stock to an operator, each unit comprising a table, a pair of spaced drums co-operating with said table and forming a permanent part of said apparatus, a liner permanently attached to said drums and movable therebetween during the storing of stock on and discharge of stock from one of said drums, and means for actuating at least one of the drums for coiling the liner and stock thereabout.

EDWARD B. ERICKSON.